US012799913B2

(12) United States Patent
Schmidt et al.

(10) Patent No.: US 12,799,913 B2
(45) Date of Patent: Nov. 17, 2026

(54) INJECTOR FOR INJECTING GAS

(71) Applicant: LIEBHERR-COMPONENTS DEGGENDORF GMBH, Deggendorf (DE)

(72) Inventors: Martin Schmidt, Regensburg (DE); Richard Pirkl, Regensburg (DE); Lydia Kapusta, Poysbrunn (AT); Martin Seidl, Deggendorf (DE); Razvan-Sorin Stinghe, Hengersberg (DE); Wolfram Klemp, Berlin (DE)

(73) Assignee: LIEBHERR-COMPONENTS DEGGENDORF GMBH, Deggendorf (DE)

( * ) Notice: Subject to any disclaimer, the term of this patent is extended or adjusted under 35 U.S.C. 154(b) by 357 days.

(21) Appl. No.: 18/262,356

(22) PCT Filed: Feb. 7, 2022

(86) PCT No.: PCT/EP2022/052888
§ 371 (c)(1),
(2) Date: Jul. 20, 2023

(87) PCT Pub. No.: WO2022/171574
PCT Pub. Date: Aug. 18, 2022

(65) Prior Publication Data

US 2024/0077051 A1 Mar. 7, 2024

(30) Foreign Application Priority Data

Feb. 12, 2021 (DE) ..................... 10 2021 103 338.1

(51) Int. Cl.
*F02M 21/02* (2006.01)

(52) U.S. Cl.
CPC .... *F02M 21/0263* (2013.01); *F02M 21/0206* (2013.01); *F02M 21/0254* (2013.01); *F02M 21/0275* (2013.01); *F02M 21/0296* (2013.01)

(58) Field of Classification Search
CPC ........... F02M 21/0263; F02M 21/0206; F02M 21/0254; F02M 21/0275; F02M 21/0296
(Continued)

(56) References Cited

U.S. PATENT DOCUMENTS 3,115,304 A * 12/1963 Humphries ............ F02M 57/02 239/93
5,287,838 A * 2/1994 Wells ................... F02M 59/462 123/506
(Continued)

FOREIGN PATENT DOCUMENTS

DE 10319920 A1 5/2004
DE 10258859 A1 7/2004
(Continued)

OTHER PUBLICATIONS

DE10319920A1 English by Google Patents (Year: 2004).*
(Continued)

*Primary Examiner* — Chee-Chong Lee
(74) *Attorney, Agent, or Firm* — McCoy Russell LLP

(57) ABSTRACT

The present invention relates to an injector for injecting gas, in particular hydrogen, preferably for directly injecting hydrogen, comprising an injector housing for holding injector components, a valve needle movably arranged along its longitudinal axis in the injector housing and configured to selectively close or release an injection opening for the flow of hydrogen therethrough, and a valve, preferably a solenoid valve, which is adapted to transfer the valve needle into a closing or releasing state by a movement along its longitudinal axis. The injector is characterized in that the valve
(Continued)

needle is a hollow needle adapted to pass a gas, in particular hydrogen, flowing through the injection port through the interior of the hollow needle.

20 Claims, 2 Drawing Sheets

(58) Field of Classification Search
USPC ........................................................ 239/533.2
See application file for complete search history.

(56) References Cited

U.S. PATENT DOCUMENTS

| | | | | |
|---|---|---|---|---|
| 5,328,094 | A * | 7/1994 | Goetzke | F02M 57/02 239/570 |
| 5,505,384 | A * | 4/1996 | Camplin | F02M 45/12 239/533.5 |
| 5,641,121 | A * | 6/1997 | Beck | F02M 47/027 239/600 |
| 5,794,860 | A | 8/1998 | Neumann | |
| 6,213,413 | B1 * | 4/2001 | Kojima | F16K 31/0655 239/585.4 |
| 6,755,360 | B1 * | 6/2004 | Anderson | F02M 61/166 239/585.4 |
| 9,441,589 | B2 * | 9/2016 | Kawazoe | F02M 61/1893 |
| 9,752,535 | B2 * | 9/2017 | Fern | F02M 21/0272 |
| 10,975,815 | B2 * | 4/2021 | Robel | F02M 59/366 |
| 2015/0152828 | A1 | 6/2015 | Kawazoe | |

FOREIGN PATENT DOCUMENTS

| | | | |
|---|---|---|---|
| DE | 10304143 | A1 | 8/2004 |
| DE | 10353011 | A1 | 6/2005 |
| DE | 102004048602 | A1 | 4/2006 |
| DE | 102014017580 | A1 | 6/2015 |
| FR | 2876160 | A1 | 4/2006 |

OTHER PUBLICATIONS

ISA European Patent Office, International Search Report Issued in Application No. PCT/EP2022/052888, Jun. 10, 2022, WIPO, 4 pages.

China National Intellectual Property Administration, Search Report Issued in Application No. 202280014381.1, Dec. 15, 2025, 2 pages.

* cited by examiner

INJECTOR FOR INJECTING GAS

CROSS REFERENCE TO RELATED APPLICATIONS

The present application is a U.S. National Phase of International Application No. PCT/EP2022/052888 entitled "INJECTOR FOR INJECTING GAS," and filed on Feb. 7, 2022. International Application No. PCT/EP2022/052888 claims priority to German Patent Application No. 10 2021 103 338.1 filed on Feb. 12, 2021. The entire contents of each of the above-listed applications are hereby incorporated by reference for all purposes.

TECHNICAL FIELD

The present invention relates to an injector for injecting a gas such as hydrogen, preferably for directly injecting hydrogen.

BACKGROUND AND SUMMARY

In the wake of increasingly stringent exhaust gas limits worldwide and ambitious climate protection targets, the environmental requirements for internal combustion engines are steadily increasing. The goal in the foreseeable future is low-emission or even zero-emission drive technologies that meet even the strictest exhaust gas limits and make a significant contribution to achieving climate protection targets. In the case of technologies that use combustion, these targets can only be achieved if climate-neutral, renewably produced fuels are used that do not cause any emissions along the entire value chain (so-called "zero emissions" fuels).

With current conventional gasoline, diesel, and gas engines, the requirements for emission-free combustion—even using so-called e-fuels, e.g., a synthetically produced OME fuel whose production requires only renewable energy—are not achievable, since the emission of harmful exhaust gases such as nitrogen oxides (NOx), unburned hydrocarbons (UHC), and soot cannot be completely reduced with current technologies.

The focus has therefore shifted to hydrogen combustion engines, which represent a promising alternative drive system. So far, however, these exist almost exclusively in very small numbers or as demonstrators with a low degree of maturity. Hydrogen generated by regenerative energies would meet all the requirements of "zero emission", since it can be burned without emissions.

In the passenger car sector, for example, hydrogen engines with external mixture formation (PFI=port fuel injection) are used, in which the fuel is thoroughly mixed with air in sufficient time before entering the combustion chamber. Hydrogen engines with direct injection of the fuel into the combustion chamber (DI=direct injection) play practically no role today, but compared with the PH concept they exhibit, among other things, higher efficiency, more stable combustion and elimination of the risk of backfiring into the intake tract.

In direct-injection hydrogen engines, a distinction is typically still made with regard to the maximum injection pressure in the injector (<60 bar: low pressure, >60 bar: high pressure), whereby the limits are not clearly defined and the transitions are fluid. Higher pressures offer the potential of shortened injection duration in a later phase of compression at higher combustion chamber pressures, resulting in increased efficiency and improved combustion stability. However, overall efficiency decreases if hydrogen compression is required beforehand.

The object of the present invention is to provide an injector for injecting gas such as hydrogen, which is simple in structure and robust against faults. In addition, the injector according to the invention is also to be capable of injecting a gas, for example hydrogen, directly into a combustion chamber cooperating with the injector. In this case, similar to fuel injectors for diesel and gasoline, it is necessary that gas is injected into a combustion chamber in a timed manner in a certain quantity and a certain concentration.

The device according to claim 1 provides an injector suitable for injecting gas into a combustion chamber, which, at the same time, has a very simple structure combined with a very low susceptibility to failure.

The injector for injecting a gas such as hydrogen, preferably for directly injecting hydrogen, comprises an injector housing for holding injector components, a valve needle which is movably arranged along its longitudinal axis in the injector housing and is configured to selectively close or open an injection opening for gas to flow through, and a valve, preferably a solenoid valve, which is configured to transfer the valve needle into a closing or opening state by a movement along its longitudinal axis. The injector is characterized in that the valve needle is a hollow needle adapted to pass a gas flowing through the injection port through the interior of the hollow needle.

By providing the hollow needle and passing the gas to be emitted through it, a particularly simple structure of an injector for injecting gas is possible. Complicated ducts for supplying a combustion gas to the at least one injection opening are not required, but the sealing of the at least one injection opening is nevertheless effected by lifting or lowering the valve needle, which is configured as a hollow needle. A further advantage of using a hollow needle is that the gas supply line can extend in a straight line from a connection side of the injector to the hollow needle, so that there is virtually no turbulence or similar negative effects.

The provision of a hollow needle, which simultaneously serves to close the at least one injection opening in a lowered state and to release this at least one injection opening in a raised state offset in the direction of its longitudinal axis, represents an essential feature for simplifying the structural design of the injector according to the invention.

According to an advantageous variant of the invention, the gas may be hydrogen.

According to an optional modification of the present invention, it may be provided that the injector is further adapted to guide all of the gas passing through the injection port through the hollow interior of the hollow needle. Thus, according to this modification, it is not contemplated that there will be other ducts for supplying hydrogen so that all of the hydrogen leaving the injector must pass through the hollow interior of the hollow needle. The person skilled in the art is aware that there are, of course, always unavoidable leaks that occur in sealing areas and through which an unavoidable minimum of the medium to be sealed also diffuses.

According to a further development of the present invention, it may be provided that the hollow needle comprises, starting from its hollow interior, at least one flow channel extending laterally outwardly, preferably in such a way that, in an open state of the injector, gas can flow around the inside and outside of the end of the hollow needle facing the injection opening. Accordingly, there may be two or more outlet openings for a gas introduced into the hollow needle.

Accordingly, in addition to the original outlet of the hollow needle, there may be at least one further outlet extending laterally to the longitudinal axis of the hollow needle. If the hollow needle has substantially a structure of a cylinder jacket surface, the at least one laterally outwardly extending flow channel pierces this cylinder jacket surface and creates a further outlet for a fluid introduced into the hollow needle. Preferably, the at least one laterally outwardly extending flow channel is located in the longitudinal half, or longitudinal third, of the hollow needle facing the at least one injection port. The further flow channel can thereby extend perpendicularly or obliquely to the longitudinal direction of the hollow needle.

According to another optional modification of the present invention, it may be provided that the hollow needle comprises a flange-like projection at its end facing the injection opening, which serves to seal the at least one injection opening located in a valve plate. This flange-like protrusion at one end of the hollow needle may be referred to as a plate, and facilitates the desired sealing of the at least one injection opening. The at least one injection port is a fluid passage through a valve plate, which ensures that fluid flow from one side of the valve plate facing the hollow needle to the other side facing away from the hollow needle is only possible through the at least one injection port.

In addition, it can be provided that sealing elements are provided between the end face of the hollow needle facing the valve plate and the corresponding side of the valve plate, which enclose the at least one injection opening on the side of the valve plate facing the hollow needle. This improves the sealing effect when the end face of the hollow needle is placed on the valve plate, since the sealing elements, which consist of rubber or the like, for example, are compressed by the force acting from the hollow needle and thus ensure very good sealing of the at least one injection opening.

Advantageously, the arrangement position of the at least one injection opening in the valve plate is offset relative to the longitudinal axis of the hollow needle, wherein if there are several injection openings, each of these is completely covered by the flange-like projection at the end of the hollow needle facing the valve plate. The valve plate can be rotationally or rotationally symmetrical to the longitudinal axis of the hollow needle.

Further, according to the present invention, it may be provided that the valve, preferably a solenoid valve, comprises an armature element movable with respect to the longitudinal axis of the hollow needle, which is firmly connected to the hollow needle, in particular by pressing, and/or is formed integrally therewith.

The armature element is the element that can be moved back and forth along the longitudinal axis of the hollow needle in the injector housing when the valve, preferably the solenoid valve, is actuated. If the valve is a solenoid valve, magnetic forces act on the armature element in such a way that, when the solenoid valve is actuated, the armature element is moved away from the valve plate along the longitudinal direction of the hollow needle in order to release the at least one injection opening. It is clear to the person skilled in the art that the implementation of the valve as a solenoid valve is advantageous, but that other ways of moving the armature element can also be used. However, the fast response and the simple implementation of a solenoid valve, which does not require a large number of error-prone moving parts, clearly show that the solenoid valve is the favored variant in the implementation of the valve.

To ensure that a movement of the armature element results in a movement of the hollow needle, these two components of the injector are firmly connected to one another and/or are formed in one piece. For example, the hollow needle can be screwed, glued and/or pressed to the armature element. It may be provided that the armature element comprises a corresponding recess which is used for inserting the end of the hollow needle remote from the valve plate and in which the hollow needle is pressed, bonded or screwed to the armature element.

According to the invention, it may be provided that the crimping may be performed in at least two different ways. In a first case, the armature surrounds the needle whereas in a second case, the needle surrounds the armature.

According to another possible further embodiment of the present invention, it may be provided that during the crimping operation the armature is crimped to abut the needle so that the armature and needle are in contact with each other. Pressing to stop may be provided in any of the various types of pressing discussed above.

It may further be provided that the armature element comprises a through opening for passing gas from a connection side of the injector to the interior of the hollow needle, wherein preferably a cavity of the hollow needle and the through opening of the armature element are coaxially arranged and/or aligned with each other.

The through-opening of the armature element can thus represent a continuation of the inner cavity of the hollow needle, wherein preferably no gradation or the like is provided in the transition region of the inner cavity of the hollow needle to the through-opening of the armature element, so that the cavity of the hollow needle and the through-opening of the armature element are aligned with each other. Accordingly, the armature member may comprise a through hole parallel to the longitudinal center axis of the hollow needle for introducing a gas to be emitted from the injector into the interior of the hollow needle through said through hole. In an assembled state of the armature element and the hollow needle, it can be provided that these two components have a common axis of rotation with respect to which the armature element and the hollow needle behave rotationally symmetrically or even rotationally symmetrically. This common axis of rotation can extend through both the through-opening of the armature element and the hollow interior of the hollow needle.

According to an optional further embodiment, it may be provided that the armature element and the hollow needle consist of different materials, preferably wherein the armature element is a magnetizable body which, when a solenoid valve is actuated, is moved in the longitudinal direction of the hollow needle and, by being connected to the hollow needle, lifts the latter from the injection opening or places it thereon.

The advantage of an arrangement in which the armature element and the hollow needle consist of different materials is that the two interconnected components can be optimized with regard to different functions. For example, it is of overriding importance for the armature element to carry out the lifting and heeling movement in the longitudinal direction of the injector, which is transmitted to the hollow needle due to the connection with the latter. If, for example, a solenoid valve is used, it is essential that the armature element is a magnetizable body that can be moved by the action of magnetic field lines. The hollow needle, on the other hand, need not be magnetizable due to its connection to the armature element itself, but may be a non-magnetizable body optimized with respect to other requirements (for example, sealing the at least one injection port in the valve plate and/or sliding friction with a needle guide). Therefore, it may be advantageous if the valve needle and the armature element are not made of the same materials.

Further, according to the invention, it may be provided that the injector is further provided with an elastic element, preferably a spring element, which is configured to urge the armature element in a direction away from a connection side in order to bias the hollow needle connected to the armature element towards the injection opening, wherein preferably the elastic element is a spiral spring whose spring force acts parallel to the longitudinal direction of the hollow needle.

Thus, when the valve is in an unactuated state, it can be ensured that the armature element and the hollow needle fixed thereto are biased against the valve plate with the injection openings provided therein. In such a state, the at least one injection opening is closed by the hollow needle biased against the valve plate, so that a gas introduced under a certain pressure into the injectors at a connection side cannot exit the injector. The at least one injection opening is only released when the valve is actuated, causing the armature element to move away from the valve plate together with the hollow needle. This movement must overcome the force acting on the armature element through the elastic element, which means that when the valve is deactivated, the elastic element automatically causes the hollow needle to be lowered onto the valve plate, thereby closing the at least one injection opening.

The elastic spring element may be a spiral spring that is supported on the injector housing or on a component rigidly connected to it (e.g. an armature counterpart). Typically, the elastic spring element engages on the side of the armature element opposite the hollow needle. Further, a central axis or an axis of rotation or symmetry of the armature element may also extend through the interior defined by the coil of the spiral spring. Furthermore, it can also be provided that the spiral spring is arranged in a channel carrying the gas, so that the spring can come into direct contact with the gas.

According to a further advantageous embodiment of the present invention, it may be provided that a needle guide is provided which is arranged in the injector housing, surrounds the hollow needle peripherally on its outer side and is configured to permit only one movement, preferably sliding movement, of the hollow needle parallel to its longitudinal direction.

In order to move the hollow needle as precisely as possible along the longitudinal direction of the injector when the valve is actuated, a needle guide is provided which receives the hollow needle on an outer wall in such a way that it can only move back and forth in the longitudinal direction of the injector. The hollow needle can be received in the needle guide in a sliding manner in order to suppress the lateral play as far as possible.

It can also be provided that the hollow needle comprises a coating on its outside and/or the needle guide comprises a coating on its inside for low-wear sliding, in particular a coating containing carbon. Such a coating is particularly advantageous when gas or hydrogen is injected through the injector since gases in general and hydrogen in particular have no lubricating properties.

The needle guide is preferably a separate component from the injector housing, which is inserted into the interior of the housing and can have a certain amount of play in the longitudinal direction of the injector housing, i.e. can move to a small extent in the longitudinal direction without giving up the basic function of a needle guide. This clearance is particularly advantageous because when the injector is installed in a corresponding motor, high axial forces act in the longitudinal direction of the injector housing (usually as a result of screwing in the injector housing or fitting and tightening a union nut) and any resulting change in the length of the injector housing can be compensated for by the clearance.

It may further be provided that at least one guide tape is arranged between the hollow needle and the needle guide, which serves as a sliding partner between the hollow needle and the needle guide, wherein preferably the guide tape is attached to the hollow needle or the needle guide.

Furthermore, it may also be provided that at least two guide tapes are used, which are preferably attached to the needle and/or the needle guide. It is also possible that a first guide tape is arranged on the needle and a second guide tape on the needle guide.

According to a further optional modification of the present invention, it can be provided that an interference fit existing between the armature and the needle, for example a press fit, is arranged between two guide tapes axially spaced apart from one another, as seen in the axial direction. By providing the press fit in the axial direction between two guide tapes spaced apart therefrom, the pressing force is applied uniformly to a needle guide, so that any wedging of a guide tape is thereby also virtually excluded.

For the provision of the guide tape, corresponding grooves can be provided on the outside of the hollow needle, or grooves can be provided on the inside of the needle guide, into which a guide tape is inserted so that only part of its thickness protrudes from the groove.

According to another optional further embodiment of the present invention, it may be provided that the valve is a solenoid valve and comprises an annular solenoid coil circumferentially surrounding the armature element and capable of generating a magnetic force to move the armature element toward the connection side of the injector.

It may be provided that a coil is provided for providing a magnetic force that causes the armature element to move, for example, away from the valve plate. In order to perform such a movement, the coil typically extends around the outside of the armature element so that the armature element is partially or completely arranged in the inner area of the coil winding.

According to another optional embodiment of the present invention, it may be provided that the hollow needle and the armature element are formed rotationally symmetric or rotationally symmetric with respect to a common axis of rotation, wherein the common axis of rotation is parallel or identical to the longitudinal axis of the hollow needle.

The injector housing and/or the needle guide can also be configured to be rotationally or rotationally symmetrical with respect to this common axis of rotation of the hollow needle and armature element, which results in a simple design of the individual components of the injector.

Furthermore, according to the invention, it may be provided that the injector is adapted to inject gas into a combustion chamber without the admixture of air via the at least one injection port. In the prior art, it is widely used to already perform an admixture of air into the gas, or hydrogen, prior to an injection of such mixture into a combustion chamber, so that a mixture of fuel and air does not have to be formed first in the combustion chamber. The advantage of injecting gas directly into a combustion chamber without admixing air, so that a mixture of air and gas is not formed until the combustion chamber, is higher efficiency, more stable combustion and the exclusion of possible backfire in the intake tract, since, for example, pure hydrogen does not burn without admixing air or oxygen.

The invention also relates to an internal combustion engine with gas direct injection, in particular hydrogen direct injection, which comprises an injector according to one of the above variants.

BRIEF DESCRIPTION OF THE FIGURES

Further features, details and advantages of the invention will be apparent from the following description of figures. The Figures show in.

DETAILED DESCRIPTION

The following detailed description of the figures refers to an injector for injecting hydrogen, although it is clear to the person skilled in the art that the invention also includes an injector for injecting gas.

Figure 1:
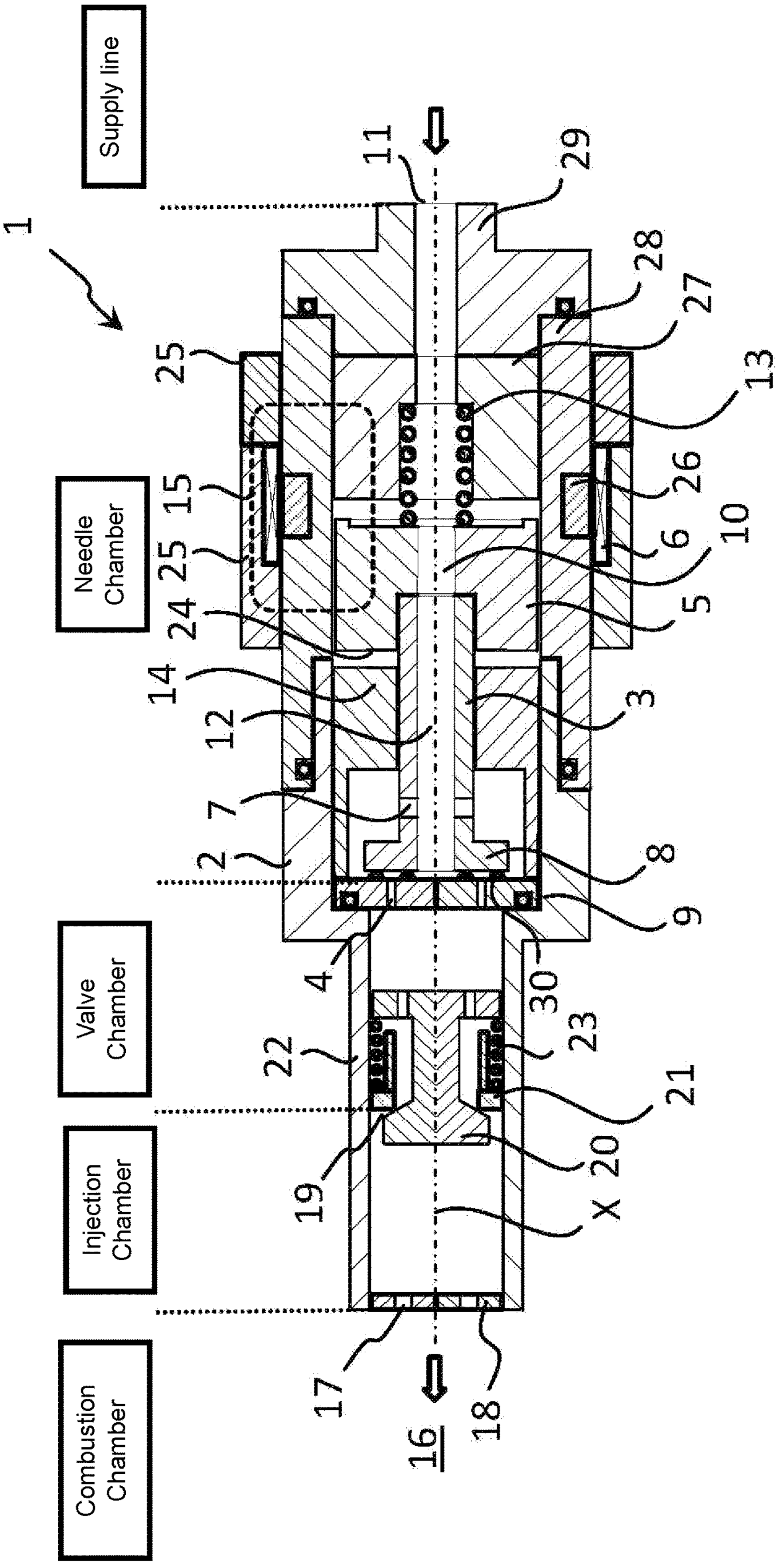
FIG. 1: a sectional view through an injector according to the invention.

FIG. 1 shows a longitudinal section of the injector 1 according to the invention for injecting hydrogen into a combustion chamber 16. The injector 1 comprises an injector housing 2 in which various components of the injector 1 are located. On the connection side, a gas connection 11 is provided for introducing a hydrogen into the injector 1. First of all, the hydrogen or another combustible fluid is passed through a bore of a cover 29 extending approximately centrally in the injector housing 2 and, following this, through a fluid channel of an armature counterpart 27, a through-opening 10 of the armature 5 and the hollow interior 12 of a hollow needle 3 to the end of the hollow needle 3 remote from the connection side 11.

Depending on the position of the hollow needle 3 relative to the valve plate 9, the injection openings 4 piercing the valve plate 9 are closed or opened. In the state shown in FIG. 1, the injection openings 4 are closed by pressing the hollow needle 3 against the valve plate 9, since the end face of the hollow needle 3 covers the opening contours of the injection openings 4. To improve the tightness, sealing elements 30 can be provided which extend around the opening contours of the injection openings 4 and contact the end face of the hollow needle 3 in a sealing state of the hollow needle 3. When the injection openings 4 are closed by the end face of the hollow needle 3, the fluid flow of hydrogen is stopped at this point of the injector 1 and there is no downstream flow of hydrogen beyond the valve plate 9.

If, on the other hand, the injection openings 4 are unblocked, which is implemented by lifting the hollow needle 3 away from the valve plate 9, the hydrogen introduced into the injector 1 at a certain pressure flows out of the interior 12 of the hollow needle 3 and exits via the plurality of injection openings 4 on the side of the valve plate 9 spaced from the hollow needle 3. After flowing through a check valve 20, 21, 23, which may optionally be provided in the injector 1, the pressurized hydrogen flows through the injection cap 18, which may also optionally be provided and which comprises at least one through opening 17. After passing through this injection cap 18, the hydrogen delivered by the injector 1 is then typically located outside the injector 1 in a combustion chamber 16. An admixture of air and a compression of the hydrogen-air mixture then generally takes place there, which then ignites or is ignited.

The check valve 20, 21, 23, which is located on the side of the valve plate 9 facing away from the hollow needle 3, serves to keep a very high pressure prevailing in the combustion chamber away from the at least one injection opening 4. Otherwise, it could happen that the very high pressure prevailing in the combustion chamber acts via the at least one injection opening 4 on the end face of the hollow needle 3 closing the injection opening 4 and moves it away from its position closing the at least one injection opening 4. In a subsequent operating step of the injector 1, the hydrogen required for combustion would then no longer be introduced into the combustion chamber 16, but rather a mixture that has already been at least partially burned, which can lead to an interruption of the combustion process or, at best, to a lower performance of the combustion process.

The check valve 20, 21, 23 comprises a valve tappet 20, a valve guide 21 and a valve spring 23, which urges the valve tappet in a closing direction, so that an outflow of hydrogen via the opening contour 19 of the check valve 20, 21, 23 only occurs if a pressure prevails on the side of the check valve 20, 21, 23 facing the valve plate 9 which is greater, at least by the restoring force of the valve tappet 20 exerted by the valve spring 23, than the pressure prevailing on the side facing away from the check valve 20, 21, 23 towards the valve plate 9. An inflow of fluid from the side of the check valve 20, 21, 23 arranged in the injection tube 22 facing the combustion chamber is thus prevented.

The valve needle 3, which is configured as a hollow needle 3, can be moved back and forth in the longitudinal direction of the injector 1. The movement of the valve needle 3 is controlled by a valve 5, 6, which in the present representation of FIG. 1 is a solenoid valve. The hollow needle 3 is firmly connected to an armature element 5, which in turn reacts to the magnetic force generated by a coil 6. The coil 6 can optionally have current flowing through it in such a way that the resulting magnetic force moves the armature element 5 in the direction of the gas connection 11. This movement also moves the hollow needle 3, which is firmly connected to the armature element 5, so that the hollow needle 3 is raised relative to the valve plate 9. This opens the injection openings 4 in the valve plate 9 so that hydrogen can flow through the valve plate 9. Possible ways of fastening the hollow needle 3 to the armature element 5 include, for example, pressing, a screw-in connection in the armature element 5, gluing or other relevant fastening options.

For precise guidance of the hollow needle 3 along the longitudinal axis or axis of rotation X of the injector or of the hollow needle 3 itself, a needle guide 14 is provided which circumferentially encloses an outer side of the hollow needle 3. In the contact area between the needle guide 14 and the outer side of the hollow needle 3, sliding friction occurs, so that it can be advantageous if one of the two contact surfaces or even both contact surfaces has a special coating, in particular a coating with carbon. It has been shown that such a coating containing carbon is advantageous with regard to the tribological requirements of the two sliding components.

The needle guide 14 can be configured in such a way that it extends from the valve plate 9 and protrudes inwardly at a certain distance from the latter, in order to come into contact with the outside of the hollow needle 3 only at the certain distance from the valve plate 9. Regardless of the specific design of the needle guide 14, the hollow needle 3 pierces the needle guide 14 in such a way that the end of the valve needle 3 facing the valve plate 9 is still completely guided through the needle guide 14 even in a state lifted from the valve plate 9. Like the armature element 5 and the hollow needle 3, the needle guide can be rotationally symmetrical or rotationally symmetrical to the axis of rotation X of the injector 1.

A flange-like projection is provided at the end of the hollow needle 3 facing the valve plate 9, which facilitates covering of the at least one injection opening 4 in the valve plate 9. In addition, the hollow needle 3 may also have further flow channels 7 extending obliquely or perpendicularly to its longitudinal direction, through which a hydrogen introduced into the hollow needle 3 can flow out. The advantage of this is that the hydrogen introduced into the injector 1 flows around the side of the hollow needle 3 facing the injection openings 4 on both sides, i.e. from the inside and from the outside. In this way, the stroke of the valve needle 3 or the armature element 5 can be minimized and yet the required flow of hydrogen can be realized. This is because the flow can be split into an external flow (via flow channel 7) and an internal flow through the outlet hole of hollow needle 3 facing valve plate 9. The flange-like projection 8, also known as the plate, is therefore flowed around on both sides.

An air gap 24 is provided between the needle guide 14 and the armature element 5, which allows some movement of the needle guide in the longitudinal direction of the injector 1. The needle guide 14 performs its primary task regardless of its exact arrangement position, so that even the slight play in the longitudinal direction of the injector 1 does not change this. In particular, however, in the event of compression of the injector housing 2, for example caused by fastening the injector 1 to a motor or thermal expansion or contraction, this air gap 24 serves as a reserve so that a change in length of the injector housing 2 in the longitudinal direction can be compensated for without introducing a force on the needle guide 14. On the side of the armature element 5 facing away from the hollow needle 3, an armature counterpart 27 is provided in which an elastic spring element 13 in the form of a spiral spring is arranged, which forces the armature element 5 in the direction of the valve plate 9. Thus, without actuating the valve 5, 6, the hollow needle 3 is urged in the direction of the valve plate 9 and closes the at least one injection opening 4. Similar to the armature element five, the armature counterpart 27 also has a through opening, the center of which may be arranged in the longitudinal center axis X of the injector 1. A simple implementation for introducing the elastic spring element 13 into the armature counterpart 27 is here to change the diameter of the through-opening of the armature counterpart 27. The step thus created is thereby used as a stop surface for the elastic spring element 13, so that design modifications beyond this are not necessary. The through opening through the armature counterpart 27 can be realized by two bores of different diameter, which have the same bore center axis. It can also be provided that the central axis of the bore is identical to the central axis of the armature element 5.

In order to improve the magnetic flux when the valve 5, 6 is implemented as a solenoid valve, the coil 6 can be surrounded on its outside by a back iron 25, in which the magnetic field can propagate particularly well. Similarly, the housing component directly surrounding the armature element 5 and the armature counterpart 27 also preferably consists of a magnetizable material. Thus, it can be advantageous if the pole tube 28, which is a component of the injector housing 2, is also made of iron or another ferromagnetic material. The same applies to the armature counterpart 27, which advantageously also consists of a magnetizable material.

A visualized representation of the magnetic field lines is illustrated by reference character 15. These have a direction that is counterclockwise when looking at FIG. 1. This pulls the armature element 5 toward the armature counterpart 27 and lifts the hollow needle 3 from the valve plate 9 or from the injection openings 4 that penetrate through the valve plate 9, so that hydrogen can flow in toward the check valve, from where hydrogen is ultimately introduced into the combustion chamber 16 via the injection cap 18.

Figure 2:
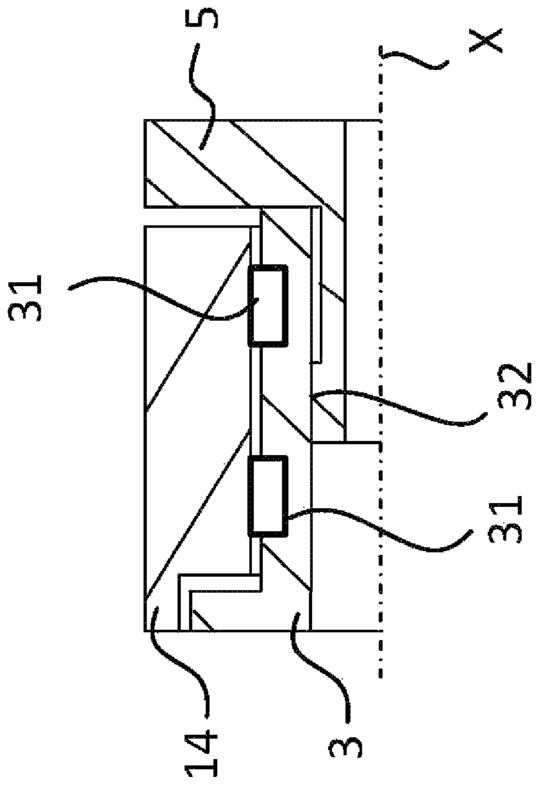
FIG. 2: a detailed sectional view of another option for pressing the armature and needle.

FIG. 2 shows a detailed sectional view of a further option for pressing armature element 5 and needle 3, showing the upper half of the relevant area when connecting armature element 5 and needle 3. recognizes that two guide tapes 31 are arranged between needle 3 and needle guide 14, which are spaced apart from one another in the longitudinal direction of injector 1. It may be provided that the contact area 32 for pressing between needle 3 and armature element 5 is provided precisely in the area of the distance between the two guide tapes 31 extending in the longitudinal direction of the injector 1. As a result, a uniform force acts on the two guide tapes 31 when sliding between the needle 3 and the needle guide 14. It is also no longer possible for a single guide tape 31 to tend to warp due to the application of a force that is not uniformly balanced as a result of the pressing, and to no longer slide cleanly along the needle guide 14.

It is clear to the person skilled in the art that the design of the interference fit between armature 5 and needle 3 shown in FIG. 2 must not be understood as restrictive, but that the invention also includes the provision of only one guide tape 31 or more than two guide tapes 31 with identical arrangement of armature 5 and needle 3.

The invention claimed is:

1. Injector for injecting a gas, comprising:

an injector housing for holding injector components, a valve needle which is arranged movably along a longitudinal axis of the injector housing and is configured to selectively close or open at least one injection opening for a flow of the gas through it, a valve which is configured to transfer the valve needle into a closing or releasing state by a movement along the longitudinal axis of the injector housing, and a check valve located on a side of a valve plate facing away from the valve needle, wherein the valve needle is a hollow needle configured to guide the gas flowing through an injection port through an interior of the hollow needle, and the check valve is the only valve positioned between the valve plate and an injector cap, the injector cap opening into a combustion chamber.

2. Injector according to claim 1, wherein the injector is configured such that the check valve is a last valve the gas is flowed through in the injector prior to the gas being flowed into the combustion chamber, wherein the injector is further configured to guide all of the gas flowing through the injection port through the interior of the hollow needle, wherein the check valve is positioned within the injector housing, and wherein the check valve is further positioned between the at least one injection opening and the valve needle.

3. Injector according to claim 1, wherein the hollow needle comprises, starting from its interior, at least one flow channel extending laterally outwardly.

4. Injector according to claim 3, wherein in an open state of the injector, water can flow around an end of the hollow needle facing the at least one injection opening on an inside and outside.

5. Injector according to claim 1, wherein the hollow needle comprises a flange-shaped projection at its end facing the at least one injection opening which serves to seal the at least one injection opening located in the valve plate.

6. Injector according to claim 1, wherein the valve comprises an armature element which is movable relative to the longitudinal axis of the hollow needle and is firmly connected to the hollow needle.

7. Injector according to claim 6, wherein the armature element comprises a through hole for passing gas from a connection side of the injector to the interior of the hollow needle.

8. Injector according to claim 7, wherein the valve is a solenoid valve and comprises an annular solenoid coil circumferentially surrounding the armature element and capable of generating magnetic field lines to move the armature element towards the connection side of the injector.

9. Injector according to claim 7, wherein a cavity of the hollow needle and the through hole of the armature element are coaxially arranged and/or are aligned with each other.

10. Injector according to claim 7, wherein the armature element is a magnetizable body which is moved in a longitudinal direction of the hollow needle upon actuation of a solenoid valve and, by connection with the hollow needle, lifts the latter off the at least one injection opening or places it thereon.

11. Injector according to claim 6, wherein the armature element and the hollow needle consist of different materials.

12. Injector according to claim 6, further comprising a spring which is configured to urge the armature element in a direction away from a connection side, to bias the hollow needle connected to the armature element in the direction of the at least one injection opening.

13. Injector according to claim 6, wherein the hollow needle and the armature element are formed rotationally symmetrical or rotationally symmetrical with respect to a common axis of rotation, wherein the common axis of rotation is parallel or identical to the longitudinal axis of the hollow needle.

14. Injector according to claim 1, further comprising a needle guide which is arranged in the injector housing, circumferentially surrounds the hollow needle on its outer side and is configured to permit only a movement of the hollow needle parallel to its longitudinal direction.

15. Injector according to claim 14, wherein the hollow needle on its outer side and/or the needle guide on its inner side comprises/comprise a coating for sliding.

16. Injector according to claim 14, wherein at least one guide tape is arranged between the hollow needle and the needle guide, which guide tape serves as a sliding partner between the hollow needle and the needle guide.

17. Injector according to claim 14, wherein the needle guide has a clearance in the longitudinal direction of the injector housing.

18. Injector according to claim 1, wherein the injector is configured to inject the gas into the combustion chamber without an admixture of air via the at least one injection opening.

19. Injector according to claim 1, wherein the gas is hydrogen.

20. Internal combustion engine with gas direct injection, comprising an injector according to claim 1.

* * * * *